3,020,279
PREPARATION OF QUINACRIDONE PIGMENTS
Paul B. Woodlock, Midland Park, John F. Santimauro, Wyckoff, and Vincent C. Vesce, Saddle River, N.J., assignors, by mesne assignments, to Allied Chemical Corporation, New York, N.Y., a corporation of New York
No Drawing. Filed Mar. 18, 1959, Ser. No. 800,092
4 Claims. (Cl. 260—279)

This invention relates to the preparation of quinacridones and pertains more specifically to a novel and highly useful process whereby linear quinacridones are obtained more easily than has heretofore been thought possible, in substantially quantitative yields and in a form directly suitable, without special conditioning treatment, for use as color pigments.

The quinacridone structure:

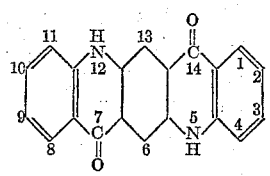

is known to result from the ring closure, with elimination of two molecules of water, of a di-2,5-arylamino terephthalic acid. This reaction, however, has heretofore required (at least in the vcase of the di-2,5-anilino terephthalic acid to give the parent linear quinacridone of the above formula) high temperature melt fusion with boric acid and has given low yields of product.

More recently it has been proposed to obtain linear quinacridone by starting with the diethyl ester of di-2,5 anilino-3,6-dihydroterephthalate and cyclizing it under non-oxidizing conditions to give dihydro-quinacridone, which is then oxidized to the desired linear quinacridone. While this method is perhaps more convenient than the melt fusion process, it suffers from the disadvantages of requiring maintenance of a non-oxidizing atmosphere during ring closure and a separate oxidation step.

It is, accordingly, the principal object of this invention to provide a more efficient and economical method of obtaining quinacridones in pigmentary form. Other related and more detailed objects will be apparent from the description of the invention to follow.

In accordance with this invention quinacridone color pigments are easily and economically prepared by the process comprising heating at moderate temperatures, above 100° C. but generally no higher than about 300° C. and preferably no higher than about 215 or 225° C., a mixture containing a 2,5-diarylamino terephthalic acid together with a substantial amount of anhydrous aluminum chloride, as dehydrating or ring-closing agent, in a liquid solvent or diluent medium which is inert or unreactive to anhydrous aluminum chloride and which boils in the range of about 120 to 300° C., preferably in the range of about 175 to 225° C. so as to carry out the reaction at refluxing temperature of the liquid medium, and then, after the heating has been continued for a time sufficient to effect ring closure and produce the quinacridone structure, which normally requires an hour up to a day or two, the quinacridone product is separated from the reaction mixture, as by filtering or the like, and, if desired, is reslurried and boiled in an organic liquid to improve or finish the pigment, and further reslurried to remove impurities, and is then recovered in substantially quantitative yield and in the form of finely-divided, intensely-colored pigments which can be used without further treatment as color pigments because of their high tinctorial strength and attractive shade.

It is quite surprising that the acid ring closes so smoothly under these conditions with anhydrous aluminum chloride as ring-closing agent since many of the conventional dehydrating and ring-closing agents are not effective and since it would have been normal for the use of aluminum chloride to result in production of the acyl chloride. It is also surprising that the quinacridone is produced directly in pigmentary form suitable for commercial use as color pigment.

In the practice of our invention we prefer to use as the reaction medium a halogenated aromatic hydrocarbon of the proper boiling point. Of these, the trichlorobenzenes, which boil at the desired reaction temperature of 200 to 230° C. and which are readily available at moderate cost, are especially suitable although such other halogenated aromatic hydrocarbons as mono-chloro benzene (B.P. 132° C.), the di-chloro benzenes (B.P. 170–180° C.), bromo-benzene (B.P. 156° C.), iodobenzene (B.P. 188° C.), chlorotoluenes (B.P. 159–162° C.), chloronaphthalenes (B.P. 260–265° C.), chlorodiphenyls (B.P. 270–290° C.), etc. are likewise inert to anhydrous aluminum chloride and may advantageously be used. The use of solvents or diluents other than the halogenated aromatic hydrocarbons which are inert to anhydrous aluminum chloride and which boil in the proper range is also contemplated.

The amount of anhydrous aluminum chloride used is generally at least as much, by weight, as that of the 2,5-diarylamino terephthalic acid and preferably the amount of anhydrous aluminum chloride is from 1.25 to 4.00 times that of the acid. Lower amounts are not as effective in producing ring closure within a reasonable time and higher amounts, although usable, offer no advantages. The anhydrous aluminum chloride can all be added initially to the reaction mixture or, alternatively, portions thereof may be added in stages after an initial addition and heating period. The amount of solvent or diluent is not critical and is fixed with relation to the ease of stirring of the reaction mass, it being understood that the ring-closure reaction occurs in presence of the solvent or diluent in amounts from as little as five or less to as much as thirty or more parts by weight of solvent or diluent for each part of the terephthalic acid.

The practice of the invention is indicated further by the following examples, which are illustrative only, and in which the parts, unless otherwise stated, are by weight.

*Example 1*

Into a reactor vessel equipped for agitation and reflux, suitably on a small scale a three-necked flask or the like fitted with a stirrer and reflux condenser, there is charged 100 parts of 2,5-dianilino terephthalic acid and 2000 parts of commercial trichlorobenzene, after which is added 150 parts of finely-divided anhydrous aluminum chloride powder. The vessel is then heated slowly over a period of 2 to 3 hours to reflux temperature and the contents allowed to reflux for a period of about 20 hours. The contents of the vessel are then cooled and filtered in any convenient way, as on a small scale by use of a Buchner funnel. The filter cake is washed with trichlorobenzene, reslurried with 3000 parts Solox (an alcohol-base general purpose solvent consisting of 100 parts denatured ethyl alcohol together with 5 parts ethyl acetate and 1 part aviation gasoline), stirred until smooth and refiltered, this process being repeated, if desired. The filter cake is then reslurried in dilute aqueous alkali (50 parts 750% NaOH solution to 400 parts water) boiled for an hour or so, refiltered and washed with hot water until free of alkali. Finally, it is reslurried in dilute hydrochloric acid (10 parts muriatic acid 20° Bé. to 400 parts water) heated to boil for an hour, again filtered and washed until acid free.

There is obtained, on drying, 84 parts (94% yield) of linear quinacridone in the form of a finely-divided red pigment powder, which when dispersed in oil yields an intensely colored bluish red pigment of high tinctorial strength and attractive shade. It is a very durable and highly stable non-bleeding pigment, with properties not generally found in the shade range. It has especial utility for uses where it may be exposed to light and where stability to chemicals, solvents, acids and alkalis is required as in automobile finishes and the like.

Example 2

The general procedure of Example 1 is repeated using the following reaction mixture:

300 parts monochlorobenzene
15 parts 2,5-dianilino terephthalic acid
30 parts anhydrous aluminum chloride The mixture is allowed to reflux for 40 hours and is then worked up as in Example 1. There is obtained a high yield of quinacridone pigment, with substantially the same properties as the pigment of Example 1.

In the above Examples 1 and 2 the quinacridone pigment product is recovered from the reaction mixture simply by filtering and reslurrying techniques to remove impurities. As has been noted above, it is also a part of the invention to "finish" the product, and thereby secure improved pigments, by reslurrying the filtered product in an organic liquid, preferably methanol or acetone, and heating the liquid under reflux for a period of an hour or so, prior to the final purification steps. These procedures, as well as other variations in the process, are illustrated in the following Examples 3 and 4.

Example 3

The following reaction mixture is prepared:

450 parts trichlorobenzene
45 parts dianilino terephthalic acid
45 parts anhydrous aluminum chloride The mixture is heated gradually over the course of 5 hours to a temperature of 214° C., the temperature at the end of each of the first four hours being 100° C., 128° C., 157° C., and 185° C. respectively, and is held at 214° C. for an additional one hour. It is then cooled to 200° C.; 225 parts additional of anhydrous aluminum chloride are added and the mixture reheated to 214° C. and held at that temperature for another hour. The mixture is then cooled and filtered and the filter cake wet with solvent is discharged into 1400 parts methanol and refluxed in methanol for an hour. After cooling, filtering and washing the filter cake with methanol until filtrate is clear, the methanol-wet cake is reslurried in an alkali solution consisting of 2400 parts water and 114 parts 50% sodium hydroxide and heated to boil for two hours. This is followed by refiltration, washing free of alkali, reslurrying in acid solution consisting of 2400 parts water and 90 parts muriatic acid (20° Bé.), reboiling for one-half hour, refiltering, washing acid free and drying the final filter cake at 140° F. There is obtained in substantially quantitative yield an excellent quinacridone pigment having a very desirable red-violet shade, the pigment having high chroma, clear hue, and great tinctorial strength, as well as possessing the durability and resistance characteristic of the quinacridone pigments. It is in every sense a highly desirable commercially-acceptable quinacridone pigment finding various uses in the color pigment field.

Example 4

The procedure of Example 3 is repeated except that acetone is employed in place of methanol as the organic liquid for the finishing of the solvent-wet filter cake, the amounts of liquid and the times of boiling, as well as the nature of the alkali and acid treatment being the same as Example 3. There is again obtained a quantitative yield of an excellent finished quinacridone pigment, having a very desirable bluish-red color but otherwise comparable to the pigment of Example 3.

Each of Examples 1 to 4 above has illustrated the preparation of linear quinacridone by the process of this invention, utilizing as the starting reactant 2,5-dianilino terephthalic acid. It is to be understood, however, that the invention is by no means limited to the use of this specific starting reactant and rather includes the use of any 2,5-diarylamino terephthalic acid to produce the corresponding quinacridone.

The 2,5-diarylamino terephthalic acid may be derived, for example, from various primary aromatic amines other than aniline (as in the case of 2,5-dianilino terephthalic acid) such as o-, m- and p-toluidine, the various xylidines, alpha and beta naphthylamine, the various ethyl, propyl and butyl anilines and other aromatic amines made up of aromatic hydrocarbon structure attached to the amino group, as well as from the various halogen substituted primary aromatic amines such as o-, m- and p-chloroaniline, p-bromoaniline, p-iodoaniline, p-fluoroaniline, the dichloro, diiodo, difluoro and dibromo anilines and the corresponding halo derivatives of the toluidines, xylidines etc., all of which are made up of halogenated aromatic hydrocarbon structure attached to the amino group. To prepare from the aryl amine, the desired 2,5-diarylamino terephthalic acid for use in this invention, it is convenient to react diethyl succinyl succinate with 2 moles of the aryl amine under oxidizing conditions to give the diethyl 2,5-dianilino terephthalate which is then hydrolyzed to the 2,5-dianilino terephthalic acid, as is well known to those skilled in the art. When any of these 2,5-diarylamino terephthalic acids is heated with anhydrous aluminum chloride in the presence of a solvent or diluent as herein described ring closure occurs with elimination of 2 moles of water and the production of a quinacridone structure in pigment form, the color of the pigment depending on the particular starting 2,5-diarylamino terephthalic acid.

The following tabulated Examples 5 to 12 illustrate the preparation of quinacridone pigments using 2,5-diarylamino terephthalic acids other than 2,5-dianilino terephthalic acid. In each case the reaction procedure is as set forth in Example 1 and in each case the quinacridone is obtained in pigment form in excellent yield.

| Examples | 2,5-Diaryl Amino Terephthalic Acid Used | Quinacridone Pigment obtained | Color of Pigment |
|---|---|---|---|
| 5 | 2,5-di-p-toluidino terephthalic acid | 2,9-dimethyl quinacridone | red violet. |
| 6 | 2,5-di-o-toluidino terephthalic acid | 4,11-dimethyl quinacridone | yellowish red. |
| 7 | 2,5-di-m-toluidino terephthalic acid | 3,10-dimethyl quinacridone | bluish red. |
| 8 | 2,5-di-p-chloro anilino terephthalic acid | 2,9-dichloro quinacridone | bluish red. |
| 9 | 2,5-di-o,p-xylidino terephthalic acid | 2,4,9,11 tetramethyl quinacridone | yellowish red. |
| 10 | 2,5-di-p-chloro o-toluidino terephthalic acid | 2,9-dichloro-4,11-dimethyl quinacridone | bluish red. |
| 11 | 2,5-di-2,5-dichloro anilino terephthalic acid | 1,4,8,11-tetrachloro quinacridone | orange. |
| 12 | di-α-naphthylamino terephthalic acid | linear angular diphenyl quinacridone | brown. |

From the foregoing description of our invention it is apparent that we provide an economical and efficient method for the preparation of quinacridone pigments of a variety of colors, all of which are exceedingly useful for the many purposes for which color pigments are conventionally employed. It is to be understood that the examples given are illustrative and that our invention is limited only by the spirit and scope of the following claims.

We claim:
1. The improvement in the process of preparing a quin- acridone by ring-closure of a 2,5-diarylamino terephthalic acid which forms a quinacridone upon ring-closure with elimination of water which comprises heating to a temperature above 100° C. and up to reflux temperature, a mixture comprising essentially the 2,5-diarylamino terephthalic acid, anhydrous aluminum chloride and a halogenated aromatic hydrocarbon diluent inert to aluminum chloride and having a boiling point in the range 120 to 225° C. for a time sufficient to effect ring closure of the 2,5-diarylamino terephthalic acid and produce a quinacridone.

2. The process of claim 1 wherein the inert liquid diluent is trichlorobenzene.

3. The process of preparing linear quinacridone in pigment form which comprises heating to reflux temperature a reaction mixture comprising essentially 2,5-dianilino terephthalic acid and at least an equal quantity of anhydrous aluminum chloride in trichlorobenzene diluent, filtering the reaction mixture, boiling the residue in a liquid organic medium selected from the class consisting of methanol and acetone, and then separating linear quinacridone in the form of finely-divided pigment of high tinctorial strength.

4. The improvement in the process of preparing a quinacridone pigment by ring-closure of a 2,5-diarylamino terephthalic acid which comprises heating to a temperature above 100° C. and up to reflux temperature, a mixture comprising essentially a 2,5-diarylamino terephthalic acid selected from the group consisting of 2,5-dianilino terephthalic acid, 2,5-ditoluidino terephthalic acid, 2,5-dimonochloroanilino terephthalic acid, 2,5-di-dichloroanilino terephthalic acid and 2,5-di-alpha-naphthylamino terephthalic acid, and at least an equal quantity of anhydrous aluminum chloride, in a liquid diluent having a boiling point in the range 120 to 225° C. and selected from the group consisting of mono-chloro benzene, bromo-benzene, iodobenzene, di-chloro benzenes, trichloro benzenes, chlorotoluenes, chloronaphthalenes and chlorodiphenyls until a quinacridone is produced, and recovering the quinacridone in the form of a finely-divided pigment of high tinctorial strength by filtering the reaction mixture.

References Cited in the file of this patent

UNITED STATES PATENTS

| 2,671,785 | Hardy et al. | Mar. 9, 1954 |
| 2,729,638 | Joyce | Jan. 3, 1956 |
| 2,821,529 | Struve | Jan. 28, 1958 |

FOREIGN PATENTS

| 332,192 | Great Britain | July 15, 1930 |

OTHER REFERENCES

Liberman: Annalen, vol. 518 (1935), pages 245–259 (pages 245–6 relied upon).

Thomas: Anhydrous Aluminum Chloride in Organic Chemistry, pages 412–415 (1941).

Chemical Reviews, pages 479–481, vol. 38 (1946).